United States Patent
Pierce et al.

[19]

[11] Patent Number: 6,042,167
[45] Date of Patent: Mar. 28, 2000

[54] CARGO BED EXTENSION

[76] Inventors: Wendell C Pierce, 1215 Frazier Dr., Dalton, Ga. 30721; Charles D McKin, 1149 James Blvd., Signal Mountain, Tenn. 37377

[21] Appl. No.: 09/004,845

[22] Filed: Jan. 9, 1998

[51] Int. Cl.[7] .................................................. B60P 3/40
[52] U.S. Cl. ............................................................ 296/26.08
[58] Field of Search ............................. 296/26.08, 26.09, 296/26.1, 26.11

[56] References Cited

U.S. PATENT DOCUMENTS

| | | | |
|---|---|---|---|
| 2,872,239 | 2/1959 | Bowness et al. | 296/26.11 |
| 5,456,511 | 10/1995 | Webber | 296/26.09 |
| 5,669,654 | 9/1997 | Eilers et al. | 296/26.11 |
| 5,755,480 | 5/1998 | Bryan | 296/57.1 |
| 5,775,759 | 7/1998 | Cummins | 296/26.11 |
| 5,806,907 | 9/1998 | Martinus et al. | 296/26.11 |
| 5,816,637 | 10/1998 | Adams et al. | 296/26.09 |

*Primary Examiner*—Gary C. Hoge

[57] ABSTRACT

The cargo bed extension/extended cargo bed liner allows the confinement, on three sides, of loads which would otherwise be too long for a standard short bed or long bed truck with the primary tailgate in the horizontal or lowered position. This is done by effectively lengthening the cargo bed by a distance, which is approximately equal to the height of the primary tailgate, while measured in the upright position. This goal is accomplished by the installation of a reinforced, unitized cargo bed extension/extended cargo bed liner and a removable auxiliary tailgate to the vehicle cargo bed, by one of several methods.

2 Claims, 9 Drawing Sheets

CARGO BED EXTENSION

CROSS REFERENCE TO RELATED APPLICATIONS

Certain claims and embodiments of this invention may also be applicable to vehicle bed liners, but are not specifically limited to that application.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates generally to tailgates on pickup trucks and vehicles having similarly attached cargo beds and tailgates.

2. Description of Prior Art

Pickup trucks and many other vehicles are specifically designed to allow the loading, transport and unloading of cargo items. This generally requires the use of a tailgate assembly which can be lowered into a horizontal position for loading and unloading and raised to a vertical position during transport to contain cargo items in the vehicle bed/cargo area.

Many of these vehicles are manufactured for appearance and function may be secondary to appearance. For instance, most manufacturers construct both long (approximately 8 foot bed length) and short (approximately 6 foot bed length) vehicles based on the same vehicle platform. The main difference is the length of the vehicle bed and therefore cargo capacity. One of the most serious encumbrances for owners of short bed vehicles is the inability to transport cargo, which is more lengthy than the vehicle bed with the tailgate in the vertical position. This can be overcome by lowering the tailgate and transporting the cargo with the tailgate in the horizontal position. This prevents the vehicle from safely transporting longer items, as the bed is not long enough to allow the cargo to reside within the cargo bed while having the tailgate assembly in its vertically oriented or raised position.

It would be desirable to have a device, which can be installed in a long or short bed vehicle to effectively increase the volumetric capacity of the cargo bed as well as provide an auxiliary vertically oriented tailgate when the primary tailgate is in the horizontal position.

Merits of this device would include greater versatility for owners of short and long bed vehicles, safety improvements for vehicle owners who currently transport loads without a vertical tailgate in place. Other obvious advantages of this device would include the ability to install it on all new pickup trucks and cargo vehicles with similar features. Installation could be performed by the original manufacturer, the dealer or the end user. Older vehicles with similar beds could likewise be retrofitted with the unitized cargo bed extension and auxiliary tailgate.

Many inventors have patented ideas relating to tailgate extensions and vertically oriented auxiliary tailgates, and the following U.S. Pat. Nos. are representative of some of these innovations: 1,266,521, 1,289,997, 2,729,499, 2,852,303, 4,023,850, 4,472,639, 4,531,773, 4,778,213, 4,889,378.

Although the aforementioned patents disclose tailgate extensions and auxiliary tailgates, none of the patented devices describe a unitized cargo bed extension with a removable vertically oriented tailgate.

Although a body of prior art exists which describes devices to extend tailgates and provide for auxiliary tailgates, the prior art previously described, does not mention or suggest a cargo bed extension with the following combination of features: (1) unitized construction utilizing current modern design and engineering techniques resulting in a marketable and functional product; (2) a bridge between the cargo bed and primary tailgate while in the horizontal position; (3) an auxiliary tailgate held in position by a plurality of vertical guides on each side of the cargo bed extension with an integral reinforcing guide along its upper edge, providing lateral support as well as a convenient handle for removal and insertion; (4) an auxiliary tailgate which can be locked into position by a multitude of locking pins or similar devices; (5) an integral reinforcing member which will reside in the void space between the cargo bed and the primary tailgate in the horizontal position; (6) two integral members for attachment to existing stakepockets or custom location to aid in installation and provide structural integrity; (7) ability to install on old and new production pickup trucks and similar cargo vehicles, (8) engineered to be easily integrated into existing vehicle bedliner products.

The following description will further establish the previous characteristics as desirable and unique to the present invention, other advantages over prior art will be rendered evident.

BRIEF SUMMARY OF THE INVENTION

To achieve the aforementioned and other advantages, the present invention, briefly described, provides a unitized cargo bed extension and removable tailgate apparatus which is designed for installation on a primary or original equipment cargo bed and tailgate assembly. The original tailgate having its proximal end connected in some manner to the vehicle and a distal end opposite the proximal end. The cargo bed extension apparatus includes a unitized body with several features.

The present invention consists of a unitized body and an auxiliary tailgate of plastic, metal, wood or composite material, which is manufactured by extrusion, blowmolding, injection or other similar means. Unit can be of hollow or solid construction and may contain certain metal reinforcements for increased rigidity and structural integrity. Unique to this invention is the unibody or one-piece construction technique and the use of metal or similar reinforcements at critical areas, such as corners, vertical tailgate guides and the members employed for attachment to the cargo bed.

The forward facing section of the apparatus has two reinforced side facing members, one on each side, which will extend in some manner to the side of the unit and be used for attaching to the vehicle cargo bed. This may be done either above or below an existing cargo bed side rail or directly to the cargo bed itself. The two members will each contain an oriented hole or slot through which a bolt or other fastener will be placed for installation to said vehicle. This will be the primary means of vehicular attachment.

An integral, reinforcing member, located on the bottom side of the invention, with a left-to-right orientation, will reside in the void space between the cargo bed and the primary tailgate when the original or primary tailgate is in the horizontal position. This member will provide structural integrity to the unitized body and will prevent movement of the apparatus in both the forward and backward directions. Although it requires no fasteners, member is the secondary means of attachment to vehicle in that it prevents movement of said invention in the forward and rearward directions.

Invention has a plurality of guides on both left and right side of the anterior portion of the main unit. These guides allow the insertion and removal of the vertically oriented auxiliary tailgate. Guides are reinforced internally with steel or other reinforcing material. Distance between guides will be such that it will allow for loading of common items such as plywood or other materials, this is in keeping with the construction parameters of most pickup trucks which have this desirable feature as a design requirement.

The removable auxiliary tailgate is constructed of materials and methods similar to the main cargo bed extension. The auxiliary tailgate may have molded ridges or similar corrugations along its length or width for the purpose of increasing structural integrity. A series of holes or slots exist on each side of the auxiliary tailgate and the main unit to allow for the use of a plurality of locking pins or similar devices which may be employed, thereby attaching the auxiliary tailgate to the main cargo bed extension. An edge located on the upper side of the vertically oriented auxiliary tailgate will serve as a reinforcing member and an integral handle to facilitate removal or installation. The left and right side of the auxiliary tailgate will be placed between a set of several guides on each side of the main cargo bed extension, while the bottom edge of the auxiliary tailgate will fit into a channel which will be an integral part of the main cargo bed extension.

The main cargo bed extension apparatus may be constructed such that it will extend from some distance inside the cargo bed across the gap or void created by the lowering of the tailgate and onto the primary tailgate while in the lowered position. This bridge will allow the smooth transition of items into and out of the cargo bed. Said invention will also aid in the prevention of rocks, sand and similar materials, carried in the cargo bed, from collecting in the void space. The leading edge of the main cargo bed extension, which rests in the cargo bed, may have reinforced edge which is beveled or otherwise chamfered, thus providing a transition to the cargo bed from the cargo bed extension and vice versa. These and other objects, as well as characteristics of the invention are described with particularity in the attached claims forming a part of this disclosure. Reference should be made to the drawings which illustrate preferred embodiments and provide a better understanding of said invention, its advantages over previous inventions and its' uses.

BRIEF DESCRIPTION OF THE SEVERAL VIEWS OF THE DRAWINGS

The specific objects of said invention will become apparent after a study of the following detailed descriptions, wherein.

DETAILED DESCRIPTION OF THE INVENTION

Figure 1:
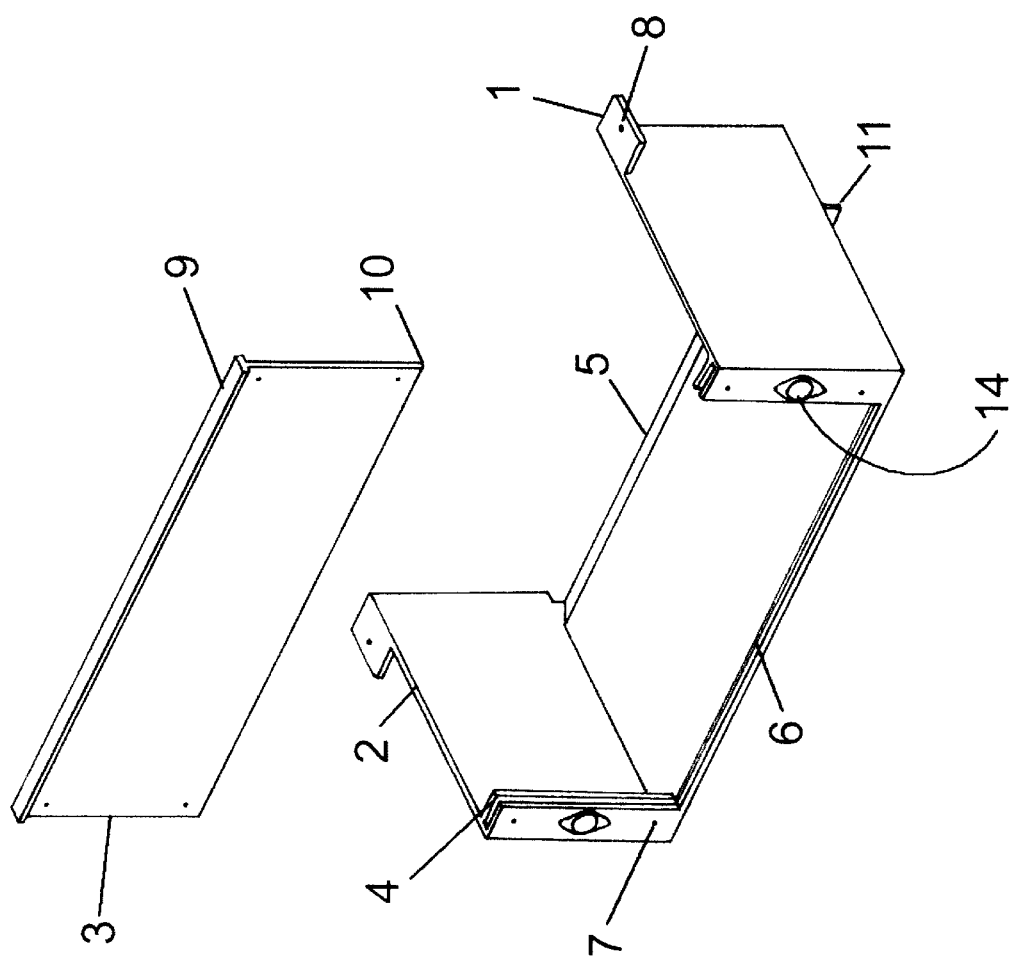
FIG. 1 is a perspective view of a first preferred embodiment of the cargo bed extension with auxiliary tailgate.
Figure 2:
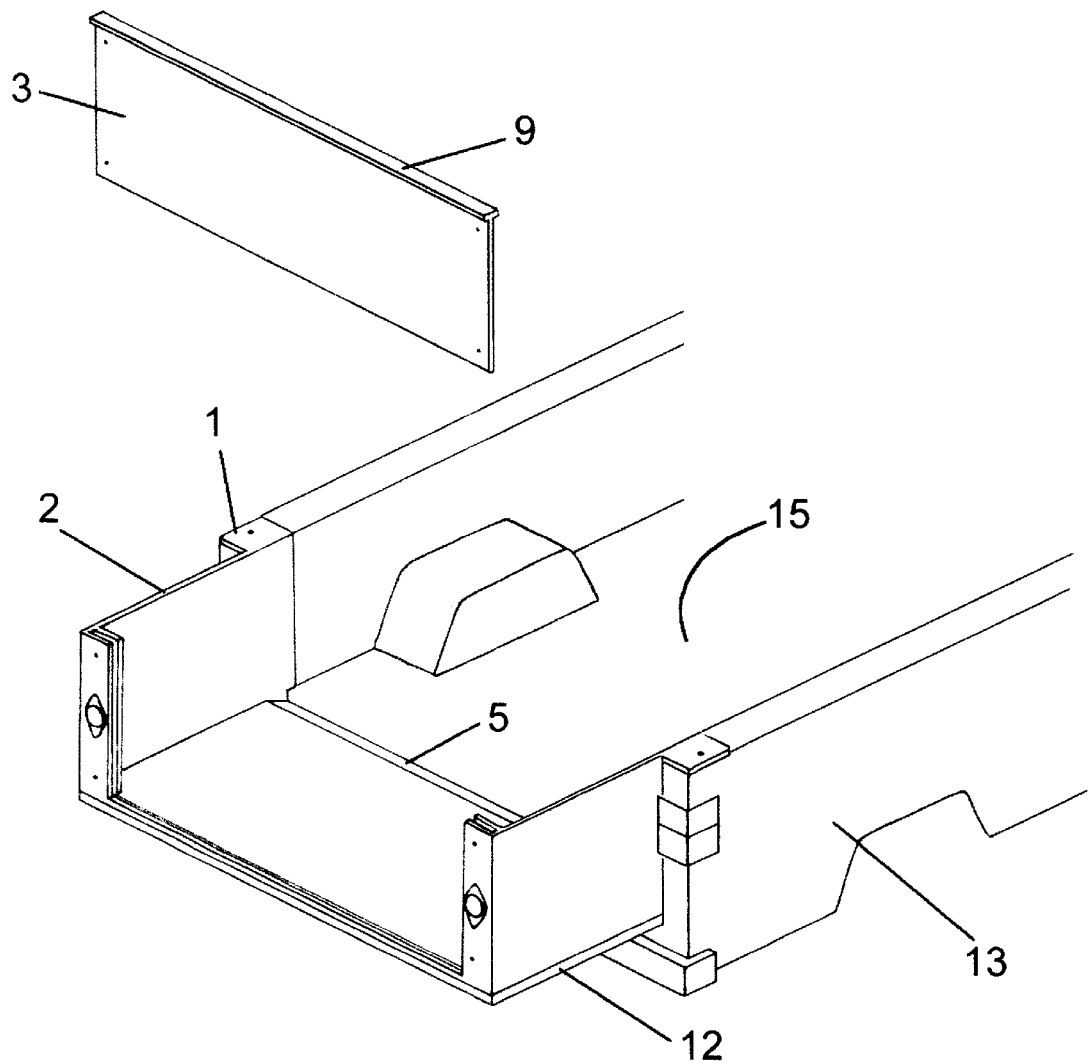
FIG. 2 is a perspective view of a second embodiment of the cargo bed extension with auxiliary tailgate installed in the primary cargo bed of a truck with the primary tailgate in the horizontal position.
Figure 3:
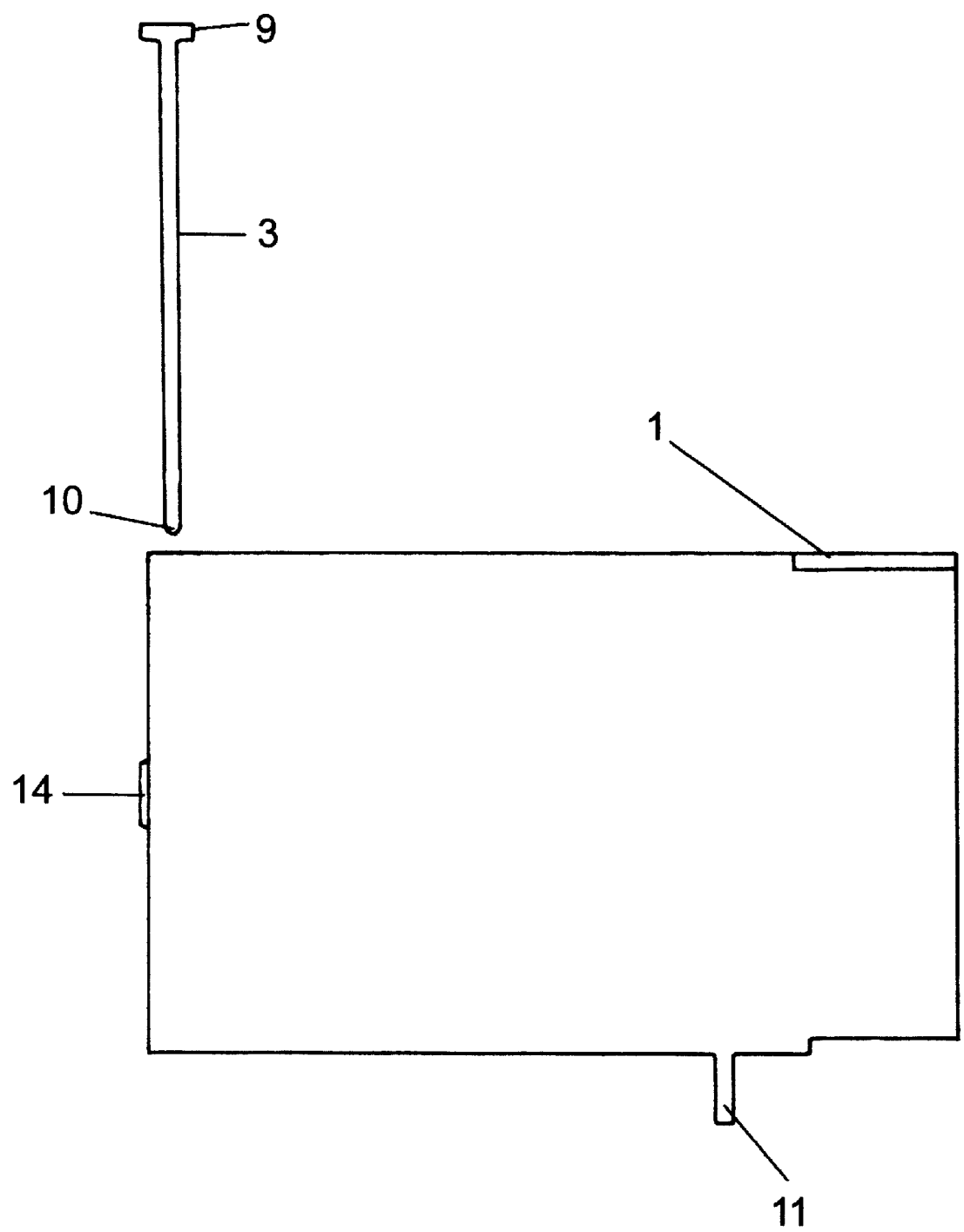
FIG. 3 is a side view of the embodiment in FIG. 2 showing the auxiliary tailgate in the vertical position, prior to insertion into the vertical guides and recessed channel. Both the vertical guides and recessed channel are shown with broken lines.
Figure 4:
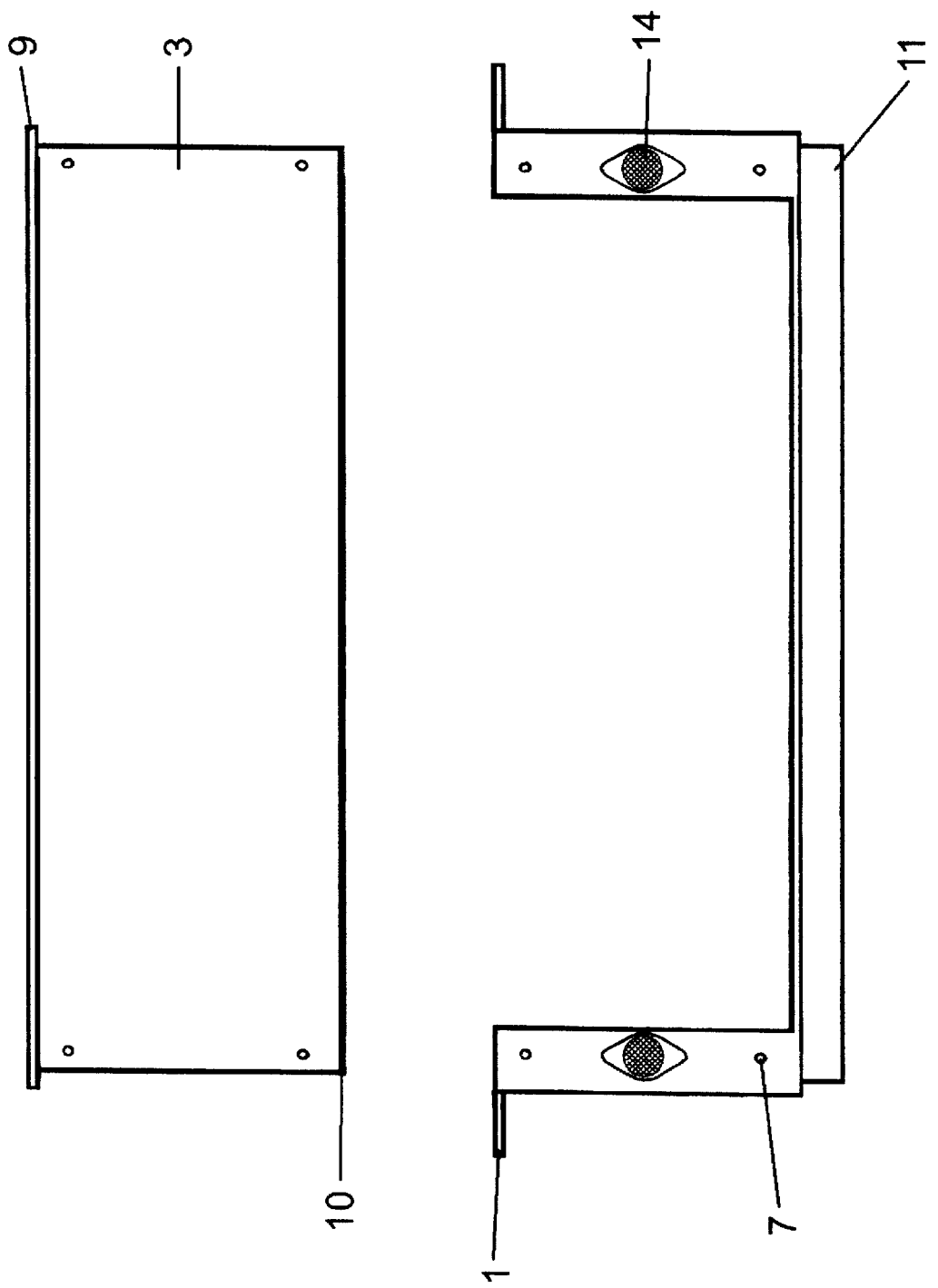
FIG. 4 is an end view of the aft end of said invention with the auxiliary tailgate not installed, showing one embodiment of holes for a variety of locking devices.
Figure 4A:
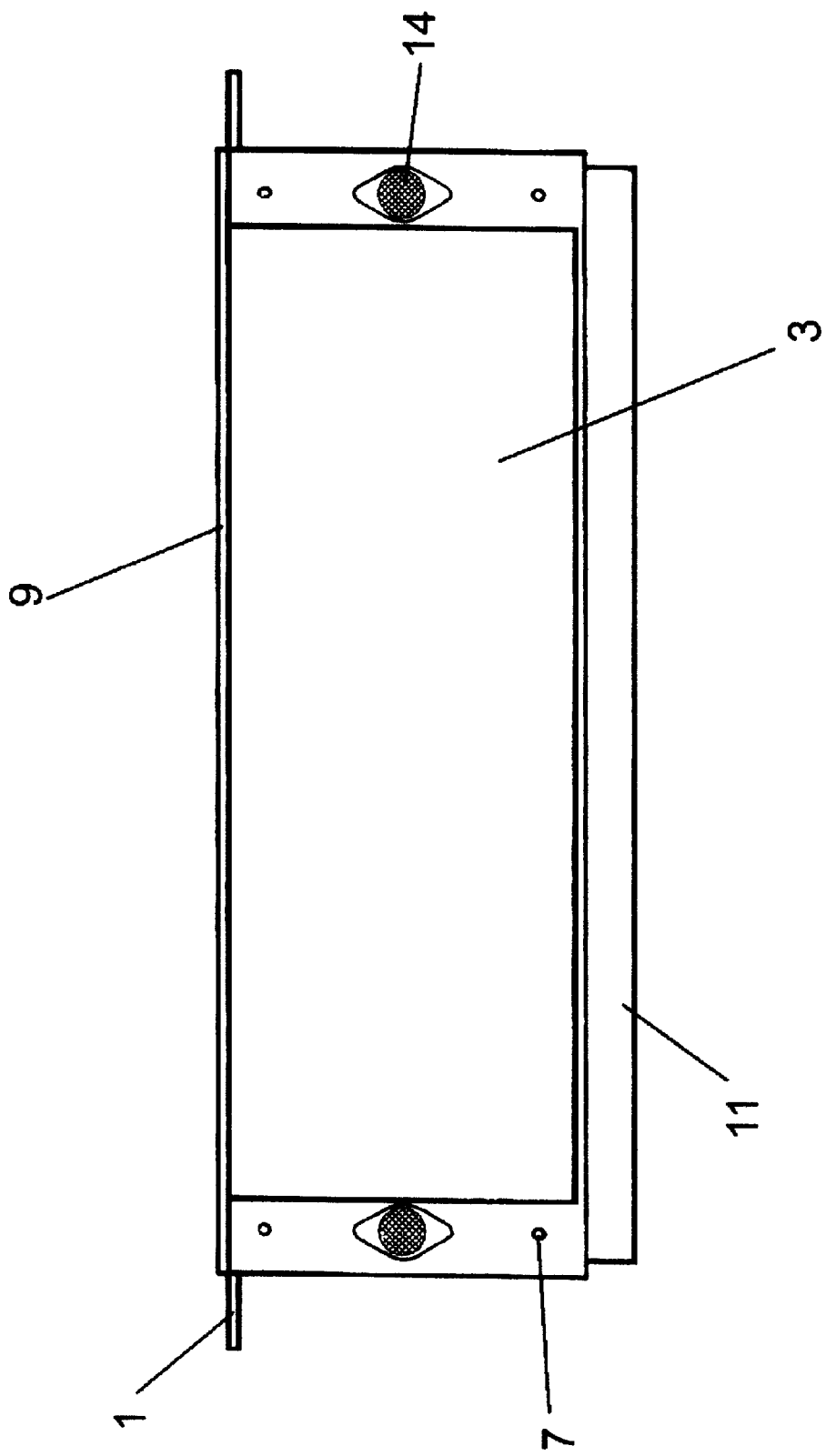
FIG. 4A is the same view of said invention in FIG. 4 with auxiliary tailgate installed.
Figure 5:
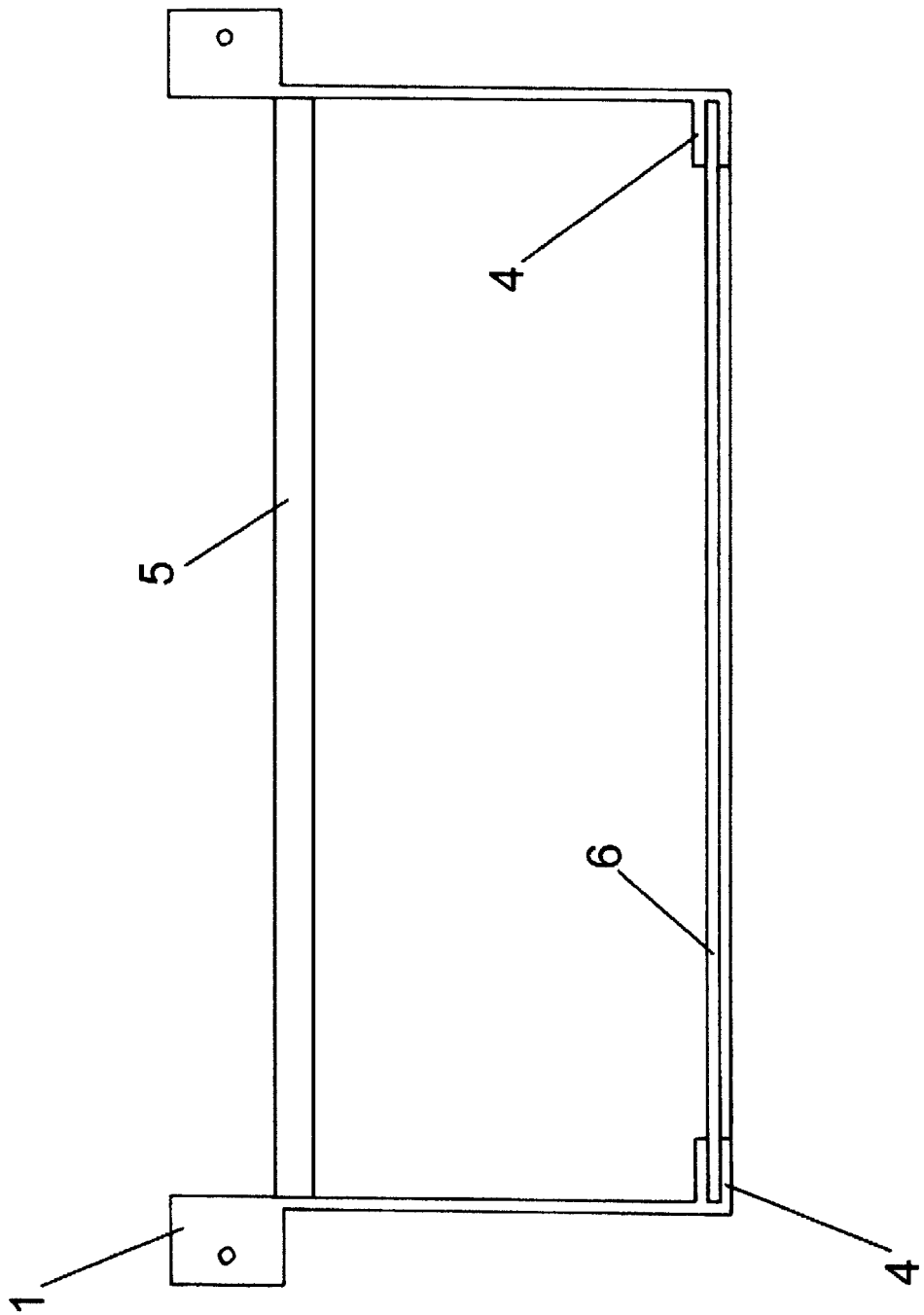
FIG. 5 is a plan view of the cargo bed extension with the auxiliary tailgate removed, to show details.

With reference to the drawings, a new and improved cargo bed extension and auxiliary tailgate will be described.

FIGS. 1–5 show a preferred embodiment of said invention. The cargo bed extension designated by numeral 2 is positioned on top of the primary or original tailgate 12 in the lowered or horizontal position, which has a proximal end attached to a vehicle and a distal end opposite the proximal end. The cargo bed extension 2 is attached to the vehicle 13 by means of side facing members 1 having a hole or slot 8 which can be aligned with existing stake pocket holes or used as a template for attaching to said vehicle 13. A second method of attachment is a left to right oriented reinforcing member 11 which resides in the void space between the vehicle cargo bed 15 and the primary tailgate 12.

Cargo is retained inside the cargo bed 15 and the cargo bed extension 2 by the installation and vertical orientation of the auxiliary tailgate 3 between the vertically oriented guides 4. Said auxiliary tailgate 3 may be attached to the cargo bed extension 2 by the use of locking devices, latches or similar methods which may make use of the series of holes 7 in the vertical guides 4.

The auxiliary tailgate 3 may also be supported along its lower edge by insertion into a recessed channel 6 or by an internal reinforcing method 10. Removal and installation of the auxiliary tailgate 3 are accomplished by the use of an engineered handle 9 along the upper surface of the auxiliary tailgate 3 while in the vertical position.

The use of a beveled edge 5 which improves the loading and unloading of cargo in the transition area between original cargo bed 15 and the primary tailgate 12 is a unique characteristic, as well as, the installation of reflective material or lights 14 on the exterior surfaces of the cargo bed extension 2 or auxiliary tailgate 3, thereby improving safety. Said lights 14 may be hardwired into vehicle electrical system or operated from auxiliary trailer wiring harnesses.

Figure 6:
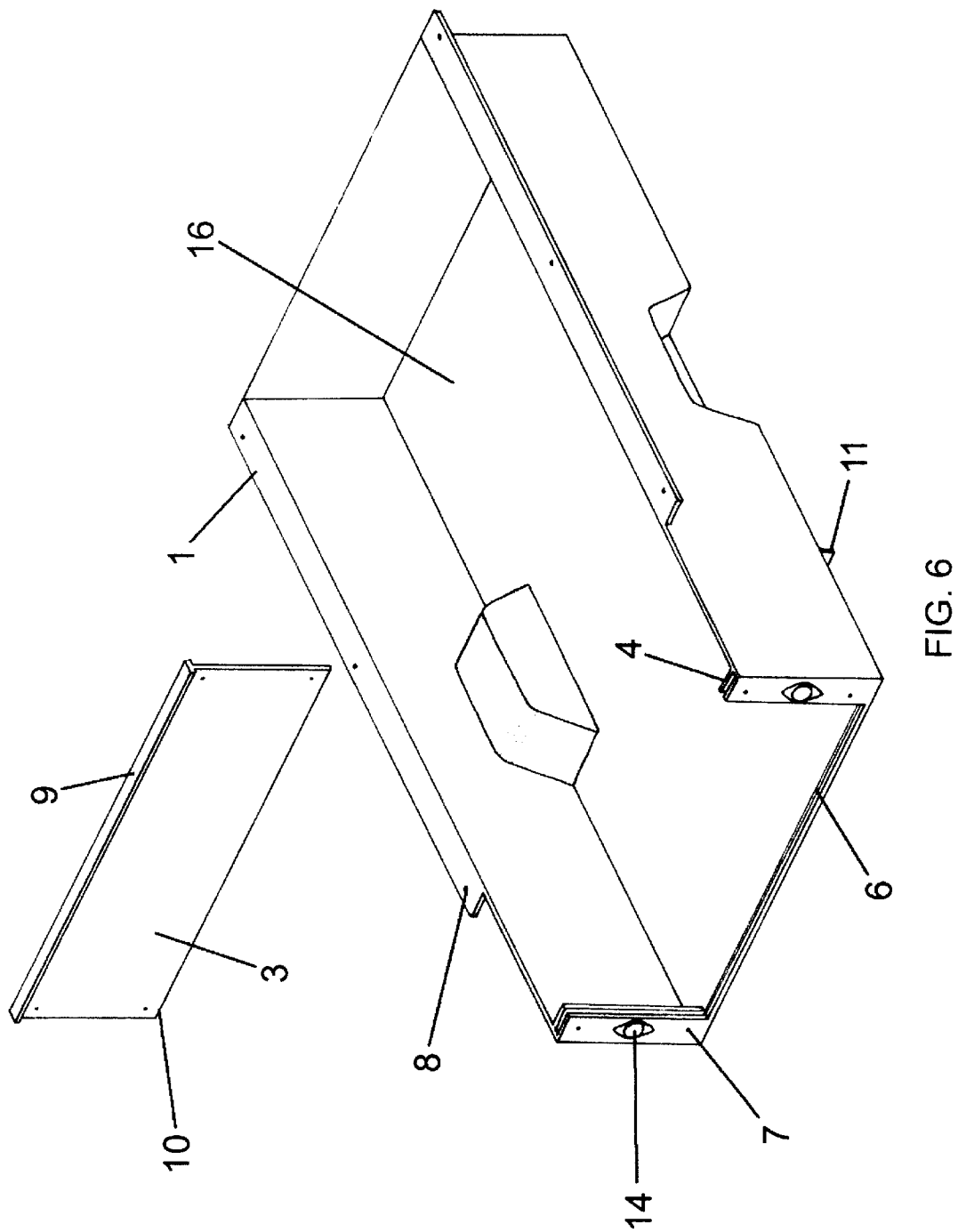
FIG. 6 is a perspective view of a second preferred embodiment of a full length bedliner and cargo bed extension with auxiliary tailgate.
Figure 7:
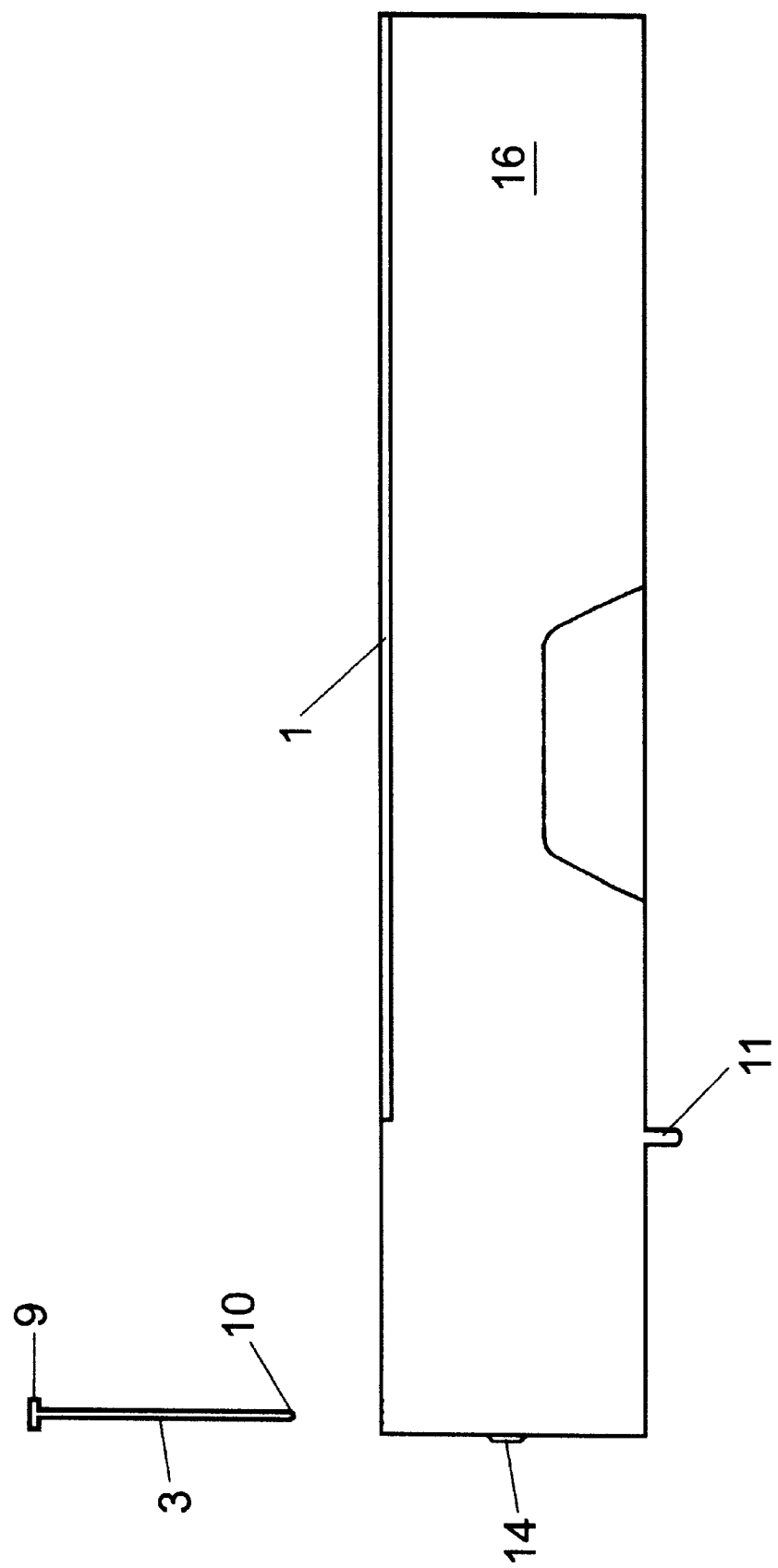
FIG. 7 is a side view of the embodiment in FIG. 6 showing the auxiliary tailgate in the vertical position, prior to insertion into the vertical guides and recessed channel. Both the vertical guides and recessed channel are shown with broken lines. Wheel wells are shown, as well as, substantially longer sides will fully line a vehicle cargo bed and may be designed for over-the-rail or under-the-rail installations.
Figure 8:
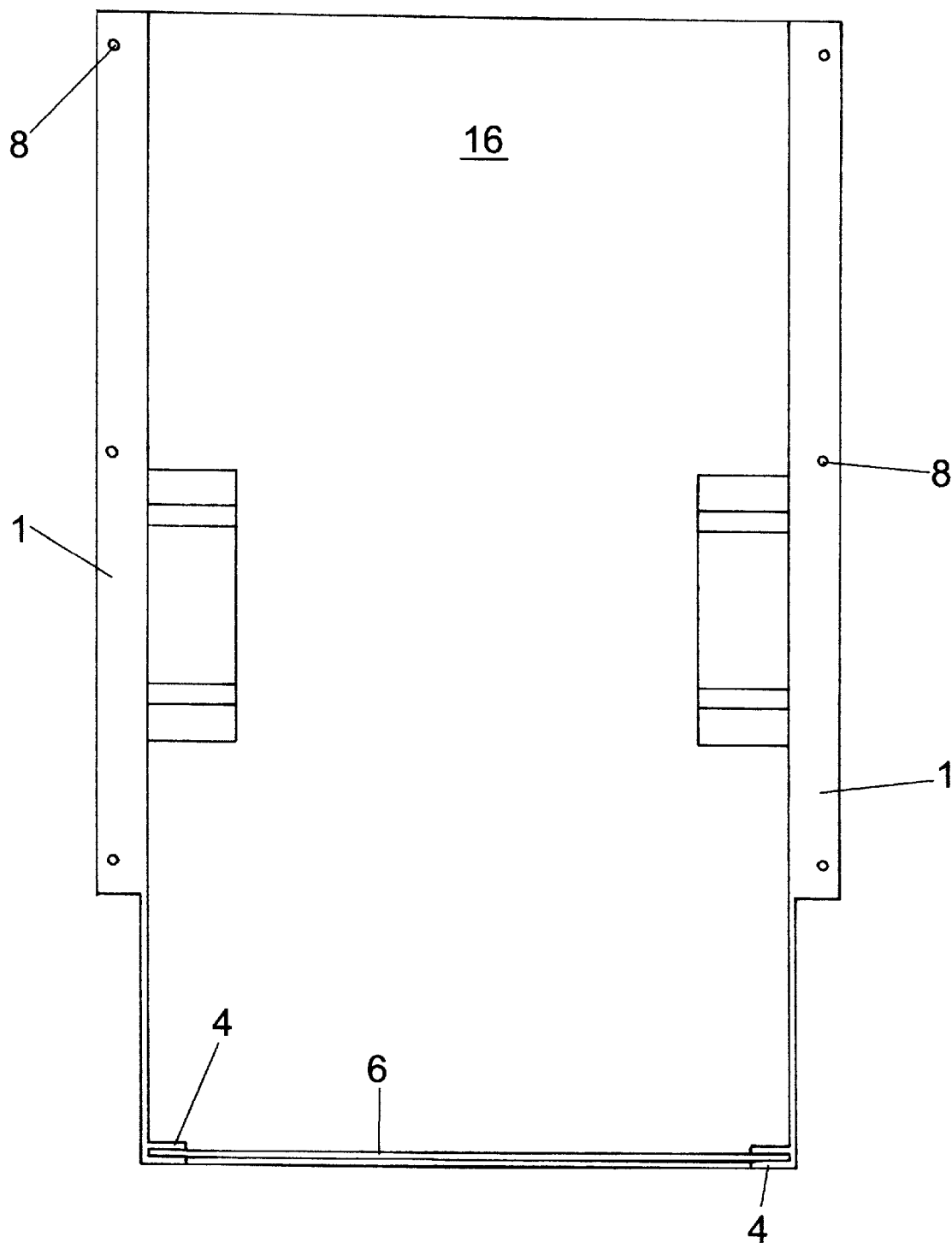
FIG. 8 is a plan view of the integrated cargo bed extension and full length bedliner with the auxiliary tailgate removed, to show details.

FIGS. 6–8 show a second preferred embodiment of the said invention which integrates a full length vehicle bedliner 16 for those inclined to need both the cargo bed extension 2 and a bedliner 16. Features of the cargo bed extension 2 and auxiliary tailgate 3 will remain the same except that the sides and bottom dimensions will be extended to form an integral bedliner 16 and beveled edge 5 is no longer needed for second preferred embodiment. Preferred embodiment may have several devices designed for attaching the full length cargo bed extension to vehicle either over-the-rail or under-the-rail.

We claim:

1. A truck cargo bed extension for increasing the volumetric capacity of the vehicle cargo bed and comprising:

a singular unitized cargo extender with a bottom being affixed on the inside between the interior sides of the truck bed and residing on top of the vehicle's primary tailgate in it's lowered position and the aftermost section of the vehicle bed, protruding into the cargo space towards the front of the vehicle and resting horizontally on the bottom of the vehicle bed;

two vertical sides being rigidly and permanently attached to the bottom element and extending out onto the tailgate in it's lowered position and protruding into the cargo space along the inside of the cargo bed walls to accommodate attaching to the vehicle;

a plurality of vertical guides on the aftermost section of the vertical sides and bottom element where they may be rigidly attached;

two side facing members rigidly attached to the top of the vertical sides forming a 90 degree angle and projecting over the top of the vehicle bed rail allowing for attachment of the entire assembly to the vehicle bed and acting as a primary means of attachment, this means of attachment is performed by the installation of the cargo bed extender with a pair or a multitude of bolts or other suitable fasteners, thereby preventing movement in all directions;

a recessed channel located along the rearward edge of the bottom element to receive the lower edge of the auxiliary tailgate when placed vertically inside the vertical guides;

a left to right oriented reinforcement along the bottom of the cargo extender, located for insertion into the void between the lowered vehicle tailgate and the vehicle bed, thereby preventing movement from front to back and left to right;

an extension of the side facing members and the bottom element fully into the cargo area to act as a unitized cargo area liner and extension and thus providing additional points of attachment to the vehicle cargo bed.

2. The cargo bed extension of claim 1, further comprising an auxiliary tailgate with a reinforcement on the upper edge which is to be used as a handle, wherein the lower edge of said auxillary tailgate fits into the recessed channel in the bottom element of the cargo bed extension.

* * * * *